US011567834B2

(12) United States Patent
Bent et al.

(10) Patent No.: US 11,567,834 B2
(45) Date of Patent: Jan. 31, 2023

(54) DATA CENTER STORAGE AVAILABILITY ARCHITECTURE USING RACK-LEVEL NETWORK FABRIC

(71) Applicant: Seagate Technology LLC, Fremont, CA (US)

(72) Inventors: John Michael Bent, Los Alamos, NM (US); Ujjwal Lanjewar, Pune (IN); Bikrant Kumar Singh, Dublin, CA (US); Mohamad El-Batal, Boulder, CO (US)

(73) Assignee: Seagate Technology LLC, Fremont, CA (US)

( * ) Notice: Subject to any disclaimer, the term of this patent is extended or adjusted under 35 U.S.C. 154(b) by 0 days.

(21) Appl. No.: 17/230,381

(22) Filed: Apr. 14, 2021

(65) Prior Publication Data

US 2022/0334923 A1 Oct. 20, 2022

(51) Int. Cl.
*G06F 11/10* (2006.01)
*G06F 11/07* (2006.01)
*G06F 11/30* (2006.01)
*G06F 3/06* (2006.01)

(52) U.S. Cl.
CPC .......... *G06F 11/1092* (2013.01); *G06F 3/067* (2013.01); *G06F 3/0619* (2013.01); *G06F 3/0659* (2013.01); *G06F 3/0664* (2013.01); *G06F 3/0683* (2013.01); *G06F 11/0772* (2013.01); *G06F 11/3034* (2013.01)

(58) Field of Classification Search
CPC ............. G06F 11/1092; G06F 11/0772; G06F 11/3034; G06F 3/0619; G06F 3/0659
See application file for complete search history.

(56) References Cited

U.S. PATENT DOCUMENTS

| 7,694,166 B1* | 4/2010 | Suggs ................ G06F 11/2025 714/4.11 |
| 8,074,092 B2 | 12/2011 | Fung |
| 10,860,213 B2* | 12/2020 | Singh ...................... G06F 3/061 |
| 2015/0113312 A1* | 4/2015 | Velayudhan .......... G06F 11/261 714/4.11 |

(Continued)

OTHER PUBLICATIONS

QNAP, "16-bay Enterprise ZFS NAS", retrieved from the internet on Nov. 28, 2020, 32 pages.

(Continued)

*Primary Examiner* — Nadeem Iqbal
(74) *Attorney, Agent, or Firm* — Mueting Raasch Group

(57) ABSTRACT

Operations are monitored that involve a plurality of servers coupled to a plurality of data storage enclosures via a rack-level, storage networking fabric. The servers are operable to provide data storage services utilizing the data storage enclosures via a network. The data storage enclosures each have one or more data storage devices. The servers and the data storage enclosures are mounted within a data center rack. A failed unit determined that includes a failed one of the servers or a failed one of the data storage devices within a selected one of the data storage enclosures. A replacement is found for the failed unit within the data center rack, and the replacement is established for the failed unit within the data center rack. The establishment of the replacement involves establishing a new connection via the storage networking fabric.

20 Claims, 7 Drawing Sheets

(56) References Cited

U.S. PATENT DOCUMENTS

2018/0024964 A1    1/2018   Mao et al.
2020/0225999 A1    7/2020   Xu et al.
2021/0019221 A1*   1/2021   Salim ...................... G06F 3/067

OTHER PUBLICATIONS

Sriramulu et al., "NVME Over Fabrics: New Class of Storage", 2018, 10 pages.
Synology, "Synology High Availability White Paper", 2019, 17 pages.

* cited by examiner

DATA CENTER STORAGE AVAILABILITY ARCHITECTURE USING RACK-LEVEL NETWORK FABRIC

SUMMARY

The present disclosure is directed to a method, system, and apparatus to increase data center availability using a rack-level network fabric. In one embodiment, a data center rack includes: a plurality of servers operable to provide data storage services via a network; a plurality of data storage enclosures each comprising one or more data storage devices; and a rack-level, storage networking fabric coupled to the servers and data storage enclosures. The storage networking fabric provides a plurality of connections between respective ones of the servers and one of the data storage enclosures. A system is configured to detect a failed of one of the servers and determine a subset of the data storage enclosures previously connected to the failed server. The system establishes a new connection via the storage networking fabric between at least one other of the servers that has not failed and the subset of the data storage enclosures. The at least one other server takes over the data storage services on behalf of the failed server.

In another embodiment, one embodiment, a data center rack includes: a plurality of servers operable to provide data storage services via a network; a plurality of data storage enclosures each comprising one or more data storage devices; and a rack-level, storage networking fabric coupled to the servers and data storage enclosures. The storage networking fabric provides a plurality of connections between respective ones of the servers and one of the data storage enclosures. A system is configured to detect a failed of one of the data storage devices within one of a selected one of the data storage enclosures, the selected data storage enclosure connected with a selected one of the servers. The system establishes a new connection via the storage networking fabric between the selected server and the at least one spare data storage device. The at least one spare data storage device is not located in the selected data storage enclosure

BRIEF DESCRIPTION OF THE DRAWINGS

The discussion below makes reference to the following figures, wherein the same reference number may be used to identify the similar/same component in multiple figures.

DETAILED DESCRIPTION

Figure 1:
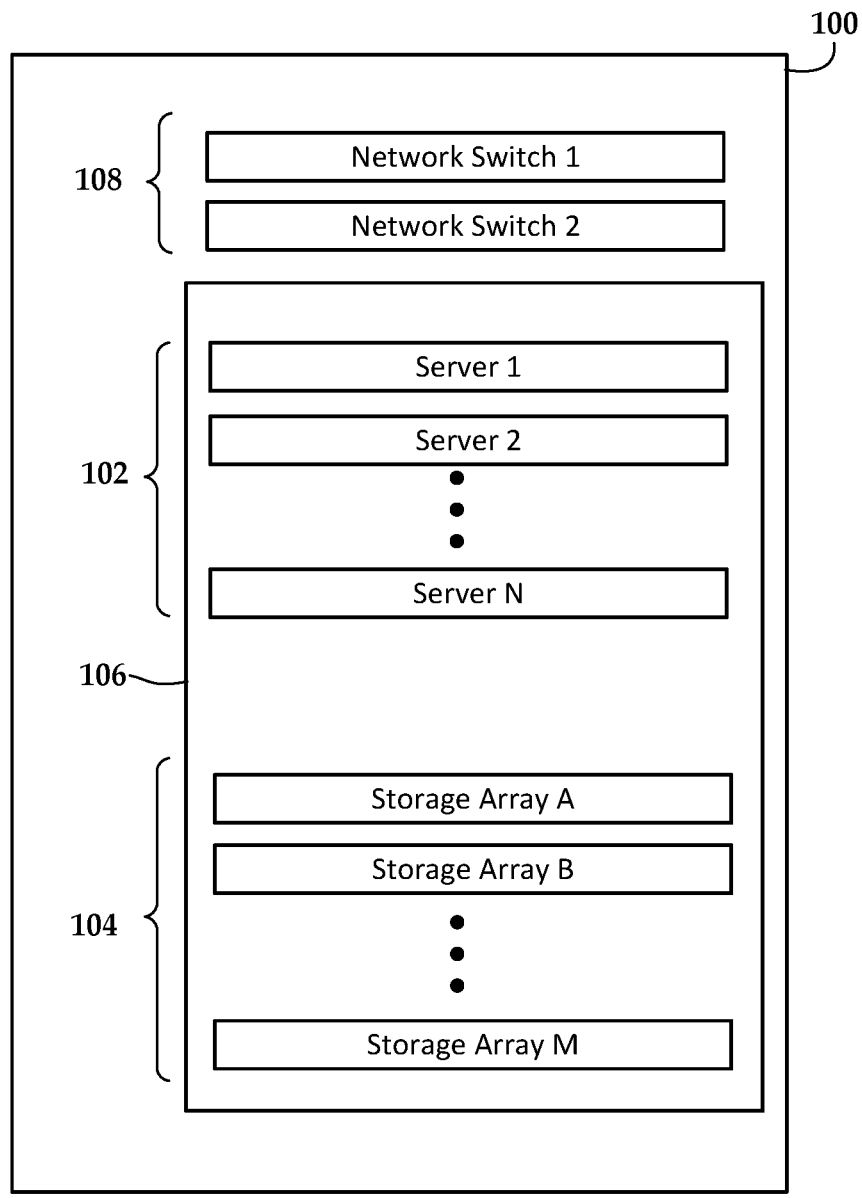
FIG. 1 is a block diagram of a data center system according to an example embodiment.

The present disclosure generally relates to data centers. A data center is a facility (e.g., a building) that houses large number of computer systems and associated components, such as network infrastructure and data storage systems. Many modern data centers, also referred to as cloud data centers, are large-scale computing facilities connected to the public Internet and used for servicing a wide variety of applications, such as cloud storage, cloud compute, Web site hosting, e-commerce, messaging, etc. In this disclosure, embodiments pertain to data storage services within a large-scale data center.

A modern data center may have storage capacity in the hundreds of petabytes. This is often provided as a cloud service over the Internet, e.g., cloud computing, cloud storage, etc. One advantage of using data centers for cloud storage is that efficiencies of scale can make storage on the data centers much cheaper than maintaining one's own data storage facilities. In addition, data centers can employ state-of-the-art protection for the storage media, ensuring data availability and durability, even in the event of equipment failures.

Generally, availability relates to redundancy in storage nodes and compute nodes such that a backup computer and/or storage device can quickly take the place of a failed unit, often without requiring human intervention. Durability relates to the ability to recover from lost portions of stored data, e.g., due to storage device failure, data corruption, etc. Durability may be improved by the use of redundant data such as parity data and erasure codes. The concept of availability and durability are somewhat related but may be independent in some scenarios. For example, if the central processing unit (CPU) of a single-CPU data center rack fails, then all of the storage provided by the rack may be unavailable. However the data in this scenario may still safe assuming the CPU failure did not damage the storage devices, thus did not negatively affect durability. For purposes of this disclosure, the term "reliability" may be used to describe both availability and durability.

In embodiments described below, strategies are described that can increase data center storage availability beyond what is provided by existing architectures. These strategies can be used with enhance durability schemes such that data center storage can become more reliable in the face of a number of different failure scenarios. These strategies can be used with known storage architectures such as Lustre, PVFS, BeeGFS, Cloudian, ActiveScale, SwiftStack, Ceph, HDFS, etc.

Conventional storage interfaces such as SATA, SAS, Fibre Channel, SCSI, etc., typically operate on the assumption that storage devices such as hard disk drives (HDD), solid-state drive (SSD), etc., are peripherals attached to a host, such that the storage device is only active and available when the host is active and available. In order for another host to take over for a failed host, the physical connection must be made or already existing to the other host. High-availability (HA) storage servers use an arrangement such as this, typically with a storage controller card between the hosts and the drives. Two or more HA servers/hosts are coupled to a set of drives, one as a primary and one or more others as a secondary. The HA servers use keep-alive signals or other means to determine if a primary host is non-responsive, and a secondary host can take over control of the drives in the event a primary host has failed.

While a HA server arrangement can increase availability of storage, it has some limitations. For example, the primary/secondary designations are typically a static setup, where the primary/secondary pairings are setup at system initialization. These setups will also have dedicated storage data links for both primary and secondary control paths. For example, consider a two host redundancy setup with server A and server B as primaries for array A and array B, respectively, and as secondaries for array B and array A. Both servers will have two data storage links for the arrays for which they are primary and secondary. If server A fails, for example, the server B becomes primary for both arrays A and B. While this arrangement works well in some implementations, it can have issues for large data centers. For example, a two host redundancy setup can still fail if a failure affects a large number of servers or arrays within a single rack. Also, such a redundancy setup may inefficiently distribute computing and storage resources.

Generally, a large data center will implement various reliability measures to ensure robust operation. These reliability measures may be generally divided into two parts. A first part provides for protection of stored data, and a second part protects against downtime due to device failure. These parts can overlap, e.g., a failure of an HDD could cause downtime in some scenarios and can also risk losing stored data. Both parts of the reliability measures use some manner of redundancy. In order to ensure the integrity of stored data, drive arrays (e.g., RAID) reserve storage partitions for redundancy data, e.g., direct copies of data, parity data, erasure codes, etc. In order to recover from device failures, backup devices (e.g., power supplies, servers, network equipment, storage controllers) are either in active operation or idled but ready to take over for a failed device.

For many implementations, the reliability measures are implemented within a single operational unit, e.g., a rack of servers and/or rack of drive arrays. Some implementations have spread the reliability measures among multiple racks, e.g., distributing chunks of data and their redundancies throughout multiple storage racks in a data center. This can improve reliability in the event an entire rack goes down, for example. Even in such an arrangement, it may be desirable to ensure the inter-rack systems maintain maximum reliability. For example, even if a significant rack failure takes out a significant portion of computing, storage, and or network processing devices, there is an advantage in reducing recovery time if the devices that remain operating can continue providing services in at least a degraded mode after the failure.

Similar significant failures can occur in the data center at-large, e.g. affecting multiple pieces of equipment at the same time. There are two modes of large-scale failure may be considered when analyzing reliability of these architectures. The first failure mode is a spatial failure burst, which involves multiple simultaneous failures within a single rack, or within multiple adjacent racks. A spatial failure burst can be protected against by using redundancy (e.g., parity, erasure codes) across physically separated enclosures.

The second form of failure mode is an aspatial failure burst, in which multiple simultaneous failures occur across multiple racks. An aspatial failure burst can be protected against by employing erasure/parity within storage racks, whereas using erasure across storage racks may be insufficient or sub-optimal. For example, some configurations that widely distribute data and erasure parity throughout the data center recommend no more than 12 drives per host/server. However, 12 drives per enclosure is a small number by today's standards, and this small number reduces the cost efficiency of the data storage units, which is one advantage of data center distributed architectures. For inexpensive mass storage, it may be desirable to have over 100 drives per host/server in order to achieve cost goals.

In embodiments described below, methods, systems, and apparatuses are described that can provide high levels of reliability within a single rack, enclosure, or other self-contained structure housing multiple storage drives and servers. This can be extended to cover multiple enclosures. While the solutions can be used for any type of data center, one example relates to storage services, e.g., cloud storage. Generally, storage services present a network interface, e.g., web page, network file system interface, etc., from which large amounts of data can be stored and retrieved. In FIG. 1, a diagram shows a computing enclosure 100 used in network storage services according to an example embodiment.

The computing enclosure 100 includes a plurality of servers 102 coupled to a plurality of drive arrays 104 via a rack-level network fabric 106. Each server 102 includes at least one CPU coupled to random access memory (RAM) and an input/output (IO) subsystem. Each server 102 may have a dedicated one or more power supplies (not shown) or the enclosure may provide power through a power bus (not shown). Each server 102 will also have an IO interface for connecting to the rack-level network fabric 106. The features and characteristics of the network fabric 106 will be discussed in greater detail below.

The drive arrays 104 may each include a separate sub-enclosure with IO busses, power supplies, storage controllers, etc. The drive arrays 104 will generally have a plurality of individual storage devices (e.g., HDD, SSD) densely packed into the sub-enclosure and the storage controller may represent groups of these devices as virtual drives, e.g., RAID volumes, JBOD volumes, etc. The virtual drives may be presented on the network fabric 106 as single drives accessible by the servers 102. In other instances, individual drives within the drive arrays 104 can be individually addressable on the network fabric 106.

The rack-level network fabric 106 can use NVMeOF (Non-Volatile Memory Express over Fabrics) which facilitates transferring NVMe storage commands over a network medium such as Ethernet or InfiniBand. The network fabric 106 may use other rack-level networking technology such as SAS switches. Generally, the network fabric 106 allows many-to-many storage data paths. In some implementations, the use of a rack-level network fabric 106 is touted as increasing storage access speed and reducing CPU overhead of servers 102.

In the present embodiments, the system within the enclosure 100 utilizes the network fabric to enhance reliability of the system. Because of the many-to-many storage paths, the 'hard' links between servers 102 and storage arrays 104 that exist in conventional HA storage arrangements can change to virtual storage paths that can be dynamically reallocated in the event of a device failure. The management of server-to-disk array links can be overseen by a central entity (e.g., a management program running on a dedicated server) or in a peer-to-peer fashion (e.g., using a peer-to-peer database such as a block chain ledger).

By relaxing the requirement for hard links (e.g., primary and secondary data links) between servers 102 can provide improved provisioning of performance to capacity. For example, the N-servers 102 and M-arrays 104 can be selected based on processing and storage requirements, without having to lock in specific amounts of CPU overhead to account for a particular HA requirement. There will still be some overhead in both processing and storage allocated, but this overhead can be based on predicted workload, predicted failure rates, etc., and the overhead can be distributed amongst all of N-servers 102 and M-arrays 104. Additionally this allows for graceful degradation upon server failure. Instead of one unlucky survivor having twice the work (as in server pairs), the work of the failed server can be spread across all surviving servers In FIG. 2, a block diagram shows a comparison between two server architectures 200, 202 according to an example embodiment. Architecture 200 represents a traditional two-server HA configuration. Each of the servers in an A-B pair are coupled to each other and act as a backup for the storage of the partner in case the partner has a failure. For example, server 204 controls drive array 206 and sever 208 controls drive array 210. Servers 204 and 208 are also coupled as backups for each other. For example, if server 204 fails, then server 208 will take over operations for drive array 206 in addition to its own drive array 210.

In order ensure that each server in this arrangement has enough processing overhead (e.g., CPU, RAM) to take over for an equivalent-capability, failed server, each server pair may have a similar amount of processing overhead allocated. In the simplified example, the processing overhead is indicated by the shaded regions, such that each server's processing capacity is about double what is needed to manage its own storage array and associated services. If it is assumed that, for example, one of the ten servers in this arrangement 200 would fail in a given time period, then this may not be the most efficient way to provision the servers.

Figure 2:
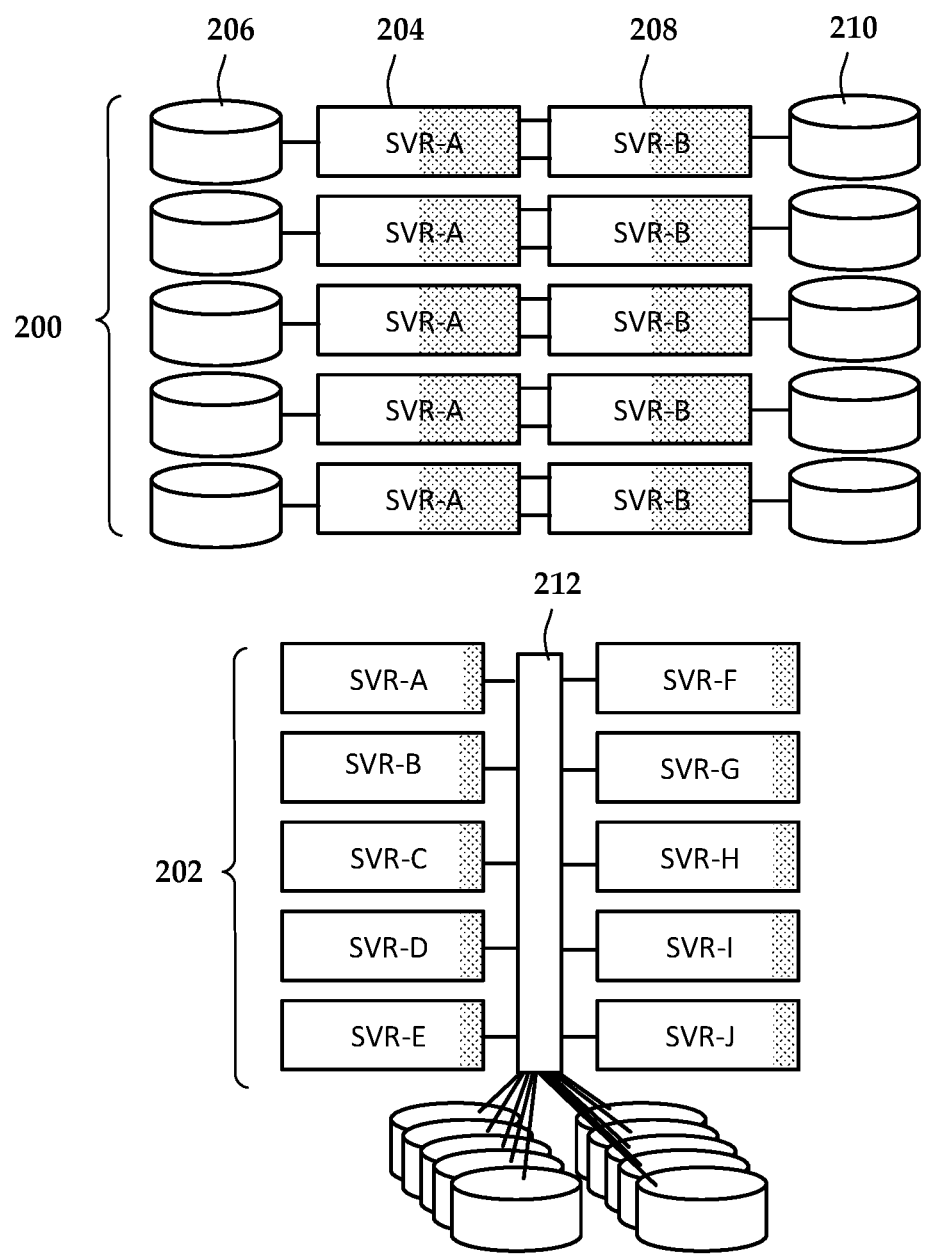
FIG. 2 is a block diagram comparing spare capacity that may be reserved for different data center embodiments.

The alternate architecture 202 shown in FIG. 2 uses the same number of servers and storage arrays, but they are coupled by a rack-level network fabric 212. Initially, each server may control one storage array similar to the other arrangement 200, but in this arrangement, if one server fails, a plurality of the remaining servers may all take over the failed server's workload. Given the same assumptions of one server failure in a given amount of time as in the other architecture 200 and the workload can be equally distributed to the nine remaining servers, each server may need much less overprovisioning, as indicated by the shaded areas, which represent about 10% of the total capacity. If the workload of the failed server is distributed to less than all of the remaining servers, e.g., four of the nine servers, then the overprovisioning would be increased appropriately.

Figure 3:
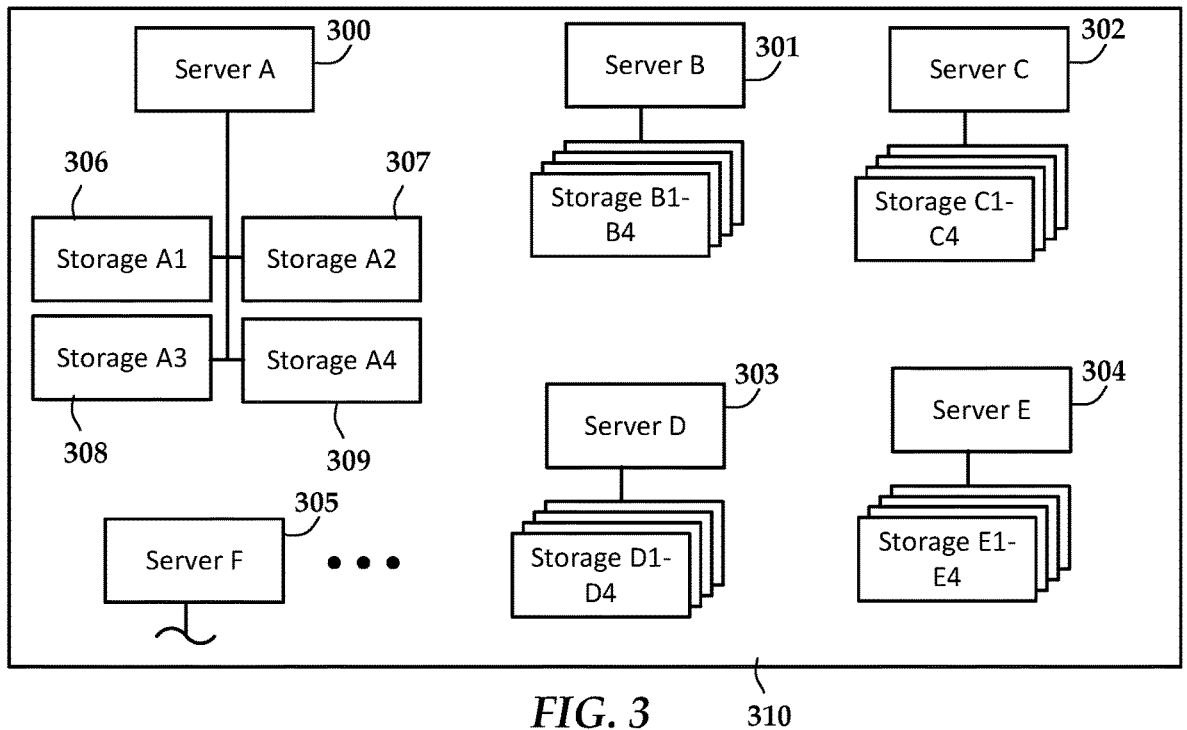
FIGS. 3-7 are block diagrams showing storage distribution schemes for high availability within a single data center rack according to example embodiments.
Figure 4:
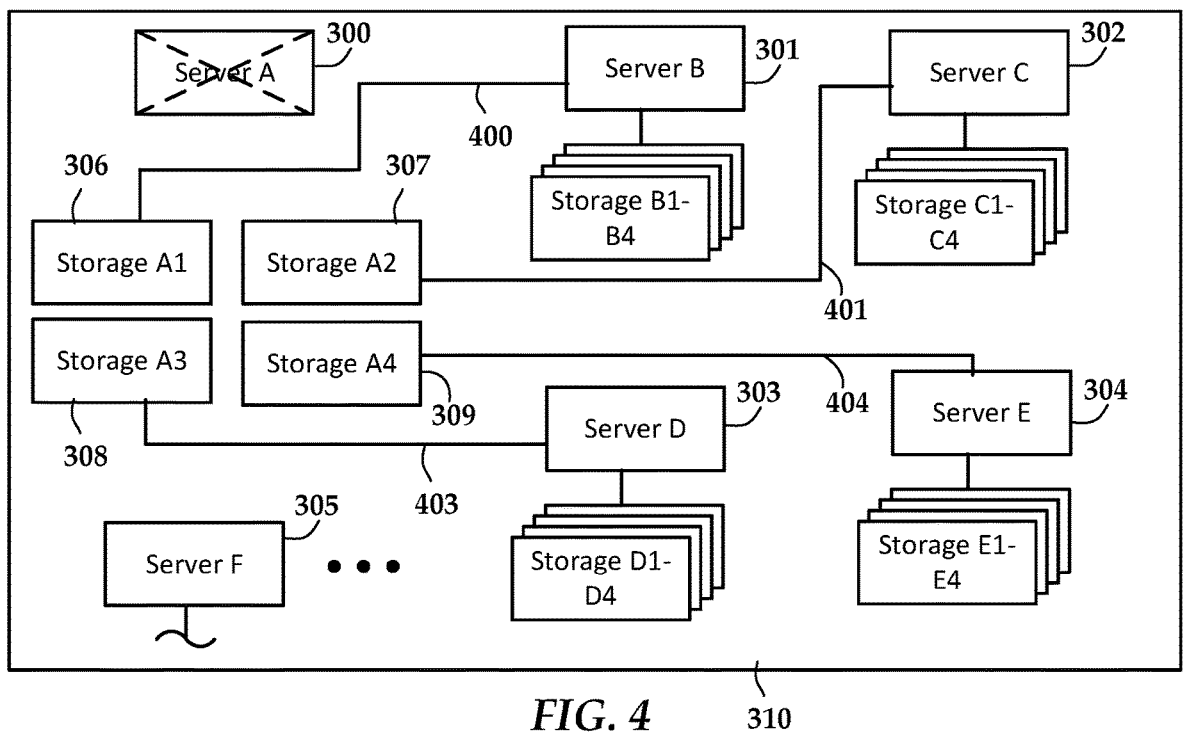

While this is a simplified example, it does indicate how a rack-level network fabric can provide high-availability without excessive over-provisioning of the processing capability of each server. The ability to distribute storage from a failed server to more than one other server may depend on, among other things, whether and how the drive arrays coupled to each server can be divided into independently operable storage units. In FIGS. 3 and 4, diagrams show a storage distribution scheme for high availability within a single rack according to an example embodiment. In reference to FIG. 3, a plurality of servers 300-305 each control four drive array enclosures, e.g., server 300 is shown controlling drive array enclosures 306-309, which are generally rack-mounted drive enclosures. The drive arrays coupled to server 305 are not shown in this view.

The servers 300-305 and associated drives are all coupled via a rack-level network fabric 310. The control lines shown connecting servers 300-305 to drive arrays are virtual, in that they are defined in software but can be readily switched between servers and drive arrays. Each drive array may have dozens of individual drives, as well as other hardware such as controller cards, backplanes, power supplies, etc. In this example, each drive array enclosure can be operated independently, however the individual drives within each enclosure cannot.

For purposes of this example, "independent" operation of drive units (e.g., individual drives, arrays, enclosures) involves the storage operations of each drive unit to be taken over by different servers without any coordination between each server. An example of independent operation may include each drive unit hosting a logical block address (LBA) range from 0-MAX. An example of a dependent operation is if two drive units are spanned by a single LBA range 0-2*MAX. In the latter case, a single file could span addresses MAX−1 to MAX such that two servers would have to coordinate to write this file. While such coordination may be possible in some architectures, it is beyond the scope of this disclosure.

As shown in FIG. 4, server 300 has failed, and new links 401-404 are created that hand off control of storage arrays 306-309 to servers 301-304, respectively. The network fabric 310 facilitates this handoff of control, and the triggering of the handoff could be any combination of server-initiated or storage-initiated. Note that since the storage arrays 306-309 in this example cannot be subdivided into independent storage units, server 305 and any other servers that may be in the enclosure will not participate in taking over the storage arrays 306-309.

Figure 5:
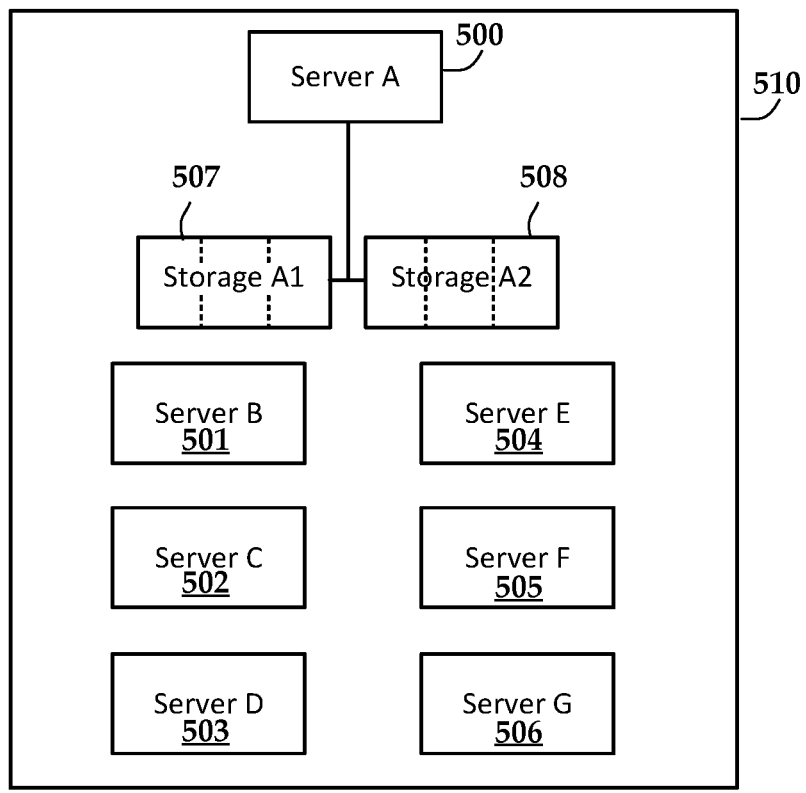
Figure 6:
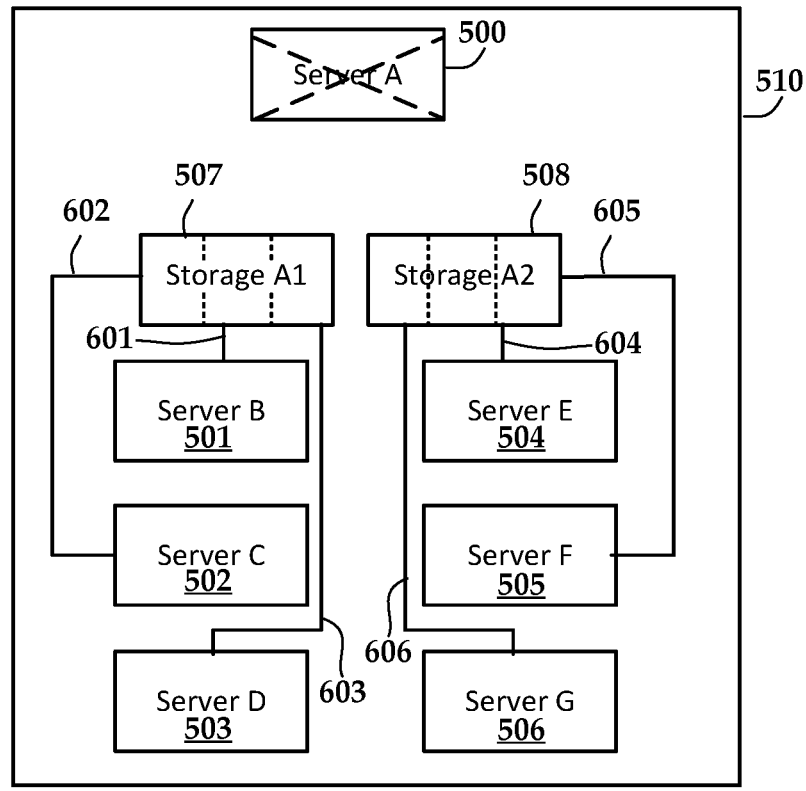

In some cases, a drive enclosure may be able to have independent groups of drives. For example, an enclosure with 50 drives may have five RAID volumes each formed of ten drives. These RAID volumes may be independently accessible via a storage network fabric, and can be allocated differently than shown in FIGS. 3 and 4. In FIGS. 5 and 6, diagrams show a storage distribution scheme for high availability within a single rack according to another example embodiment. In reference to FIG. 5, a plurality of servers 500-506 each control two drive array enclosures, although only server 500 is shown controlling drive array enclosures 507 and 508. The drive arrays coupled to servers 501-506 are not shown in this view.

The servers 500-506 and associated drives are all coupled via a rack-level network fabric 510. As in the previous figures, the control lines shown connecting servers 500-506 to drive arrays are virtual, in that they are defined in software but can be readily switched within the fabric between servers and drive arrays. As shown in FIG. 6, server 600 has failed, and new links 601-606 are created that hand off control of parts of storage arrays 607 and 608 to servers 500-506, respectively. Generally, this arrangement results in greater distribution of the workload compared to the example in FIGS. 3 and 4, given similar-sized storage array enclosures.

The flexibility provided by the storage network fabric in reassigning servers can also provide flexibility in detecting server failures and in assigning replacement servers. For example, as the storage devices themselves may be able to communicate independently of the server on the network fabric, the storage devices can detect when a server is non-responsive (e.g., polling the server using keep-alive messages or the like) and communicate this situation to one or more other servers within the rack. In one embodiment, an overseer server could detect a drive failure and assign another one or more servers to take over for the failed one. In other embodiments, the servers could devise a peer-to-peer mechanism to determine which servers would take over a failed one and how to partition the storage units previously controlled by the failed server.

Figure 7:
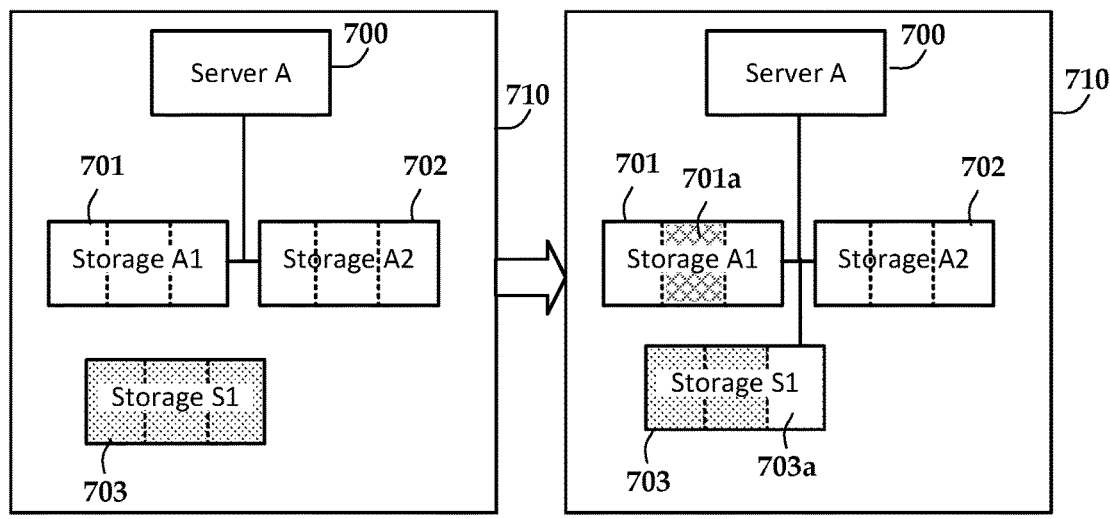

The previous examples showed how a rack-level storage network fabric could take over for failed servers. The system can also be used to provide backups for failed storage. In FIG. 7, a diagram shows storage distribution scheme for high availability within a single rack according to another example embodiment. In this example, server 700 is coupled to two storage enclosures 701, 702, that are each divided into three independent portions, e.g., arrays, virtual drives, etc. The server 700 is coupled to the storage enclosures 701, 702 via a rack-level, storage network fabric 710, as is backup storage, here shown as storage enclosure 703. As indicated by shading, all of the storage in the backup enclosure 703 is unused in the left side of the figure.

In the right side of FIG. 7, a portion 701a of storage enclosure 701 has failed. Rather than rely on its own dedicated spares, the server 700 can utilize storage enclosure 703, which is accessible via any server in the same rack that is coupled to the network fabric 710. In this example, the server 700 has used portion 703a of enclosure 703 to replace failed portion 701a. The remaining portions of enclosure 703 can be used as hot spares by any other server in the rack.

In the example of FIG. 7, the enclosure 703 was shown as a fully dedicated spare, e.g., not connected to a server in the rack. In other embodiments, each server-connected storage enclosure could have a spare portion that is initially usable by its own server, but can be independently dedicated to another server, e.g., one that has exhausted its own spares. In this way, it may be possible to provision a lower amount of spare capacity in the entire rack based on the failure modes expected in a specific storage arrangement.

Figure 8:
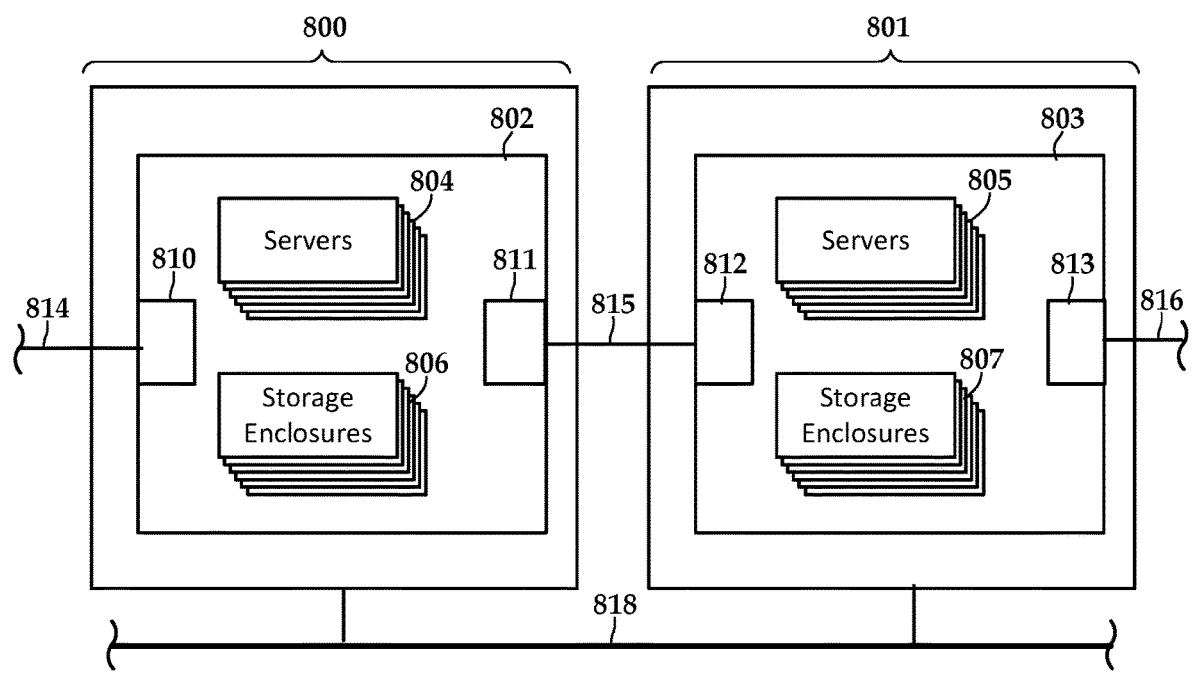
FIG. 8 is a block diagram showing a storage distribution scheme for high availability between multiple data center racks according to example embodiments

The above embodiments describe how a rack-level storage networking fabric can be used to provide high-availability in a single rack enclosure. It may be possible to extend this to multiple racks. In FIG. 8, a diagram shows an example of a multiple-rack, high-availability architecture according to an example embodiment. Two rack enclosures 800, 801 each include their own internal rack-level storage networking fabrics 802, 803 that can be used to couple servers 804, 805 with storage enclosures 806, 807, e.g., using any of the schemes described above.

Each of the rack enclosures 800, 801 includes one or more inter-fabric interfaces 810-813. These interfaces 810-813 may work similarly to Ethernet bridges, in that the interfaces inspect traffic to determine whether to pass data between racks 800, 801 using physical links 814-816. This can reduce both intra-fabric traffic and inter-fabric traffic. For example, broadcast messages or data that relates to intra-rack traffic would not need to be passed along the links 814-816. The inter-fabric interfaces 810-813 and links 814-816 could use a same or different protocol than the internal rack-level storage networking fabrics 802, 803.

Generally the links allow flexibility in HA operations, e.g., to reduce the impacts of spatial failure bursts. For example if rack 800 is experiencing high level of spare server utilization or spare storage utilization, it may be able to realize some lost capacity from adjoining rack 801. Even if the use of the cross-rack link 815 in such a case results in an increase in latency and/or a decrease in bandwidth, this may still be an acceptable tradeoff from a HA standpoint.

The communication between racks 800, 801 for HA purposes may occur via the physical link 815, or via an out-of-band communication, such as data center network 818. Each rack 800, 801 could have particular servers dedicated to inter-rack HA management, or this could be performed in a peer-to-peer fashion as described above for inter-rack fabric communications. Generally, dedicated servers may reduce the amount of network traffic used for HA management, however a peer-to-peer arrangement could be more robust.

Figure 9:
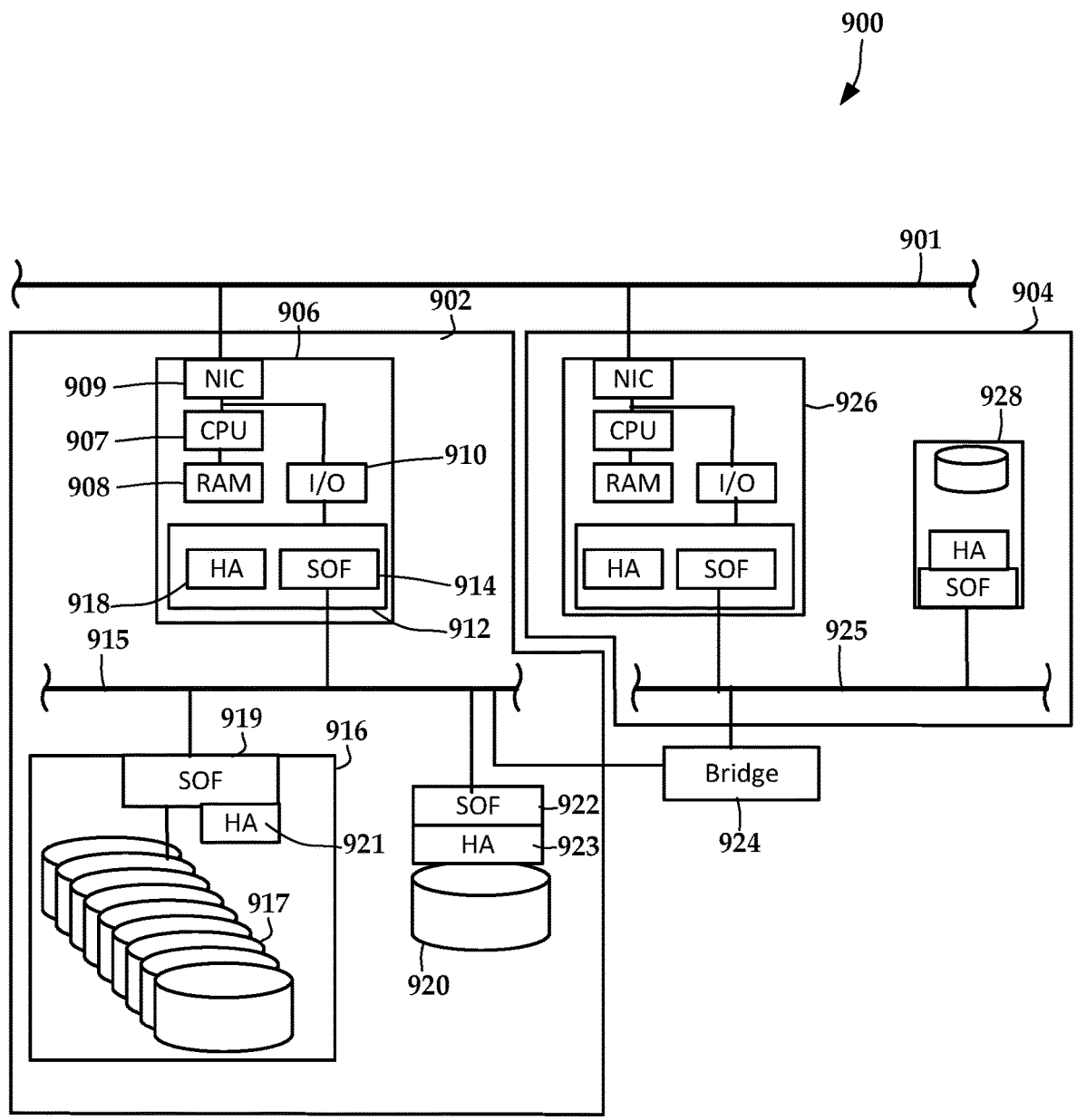
FIG. 9 is a block diagram of apparatuses in a data center system according to an example embodiment.

In FIG. 9, a block diagram shows internal components of a data center system 900 according to an example embodiment. The system includes racks 902 and 904, which are coupled via a data center network 901, e.g., TCP/IP over Ethernet. Components of rack 902 will be described in greater detail, and other racks in the system 900 may be similarly or identically configured. Rack 902 includes a server/compute unit 906 with at least one CPU 907, RAM 908, a network interface card (NIC) 909, and an I/O interface 910. These components of the server 906 may be coupled via a motherboard or other circuitry known in the art.

The I/O interface 910 includes a storage interface 912 that may include circuitry and protocols that are specialized for coupling with mass, persistent storage. The storage interface 912 is coupled to one or more drive array enclosures 916 via a storage network fabric 915 of the rack enclosure 902. The drive array enclosure 916 includes a plurality of persistent storage devices 917 (e.g., HDD, SSD) that may be coupled to one or more circuit boards (e.g., backplanes) and may be arranged into storage pods. The drive array also includes a storage over fabric (SOF) interface 919 that facilitates communications over the storage network fabric 915. The storage interface 912 of the server 902 includes a corresponding SOF interface 914. The rack system 902 may include multiple instances of the drive array 916 and/or storage controllers 912.

The server 906 and/or storage controller 912 may include HA control modules 918, 921 that enable the components of the rack 902 to establish a replacement for similar failed units. If the failed unit is a failed server, the establishing of a replacement involves establishing the new connection via the storage networking fabric 915 between at least one other of the servers that has not failed and a subset of the data storage enclosures associated with the failed server. If the failed unit is the failed data storage device in a selected data storage enclosure, the establishing of a replacement comprises establishing the new connection via the storage networking fabric 915 between a selected server coupled to the selected data enclosure and a spare data storage device. The replacement unit may be within the rack 902, or between two racks 902, 904.

Note that for failed data storage devices, a server may only need to replace a single device, e.g., HDD, SSD. In some arrangement, and individual data storage device 920 may be coupled to the storage networking fabric 915 via an SOF interface 922 and HA controller 923. In this way, the data storage device 920 may be usable as a hot spare for any server in the rack (and in other racks, as will be described further below). The data storage device 902 may still be housed in an enclosure physically similar to drive array enclosure 916, but with different data couplings, e.g., coupling straight to the storage networking fabric 915 instead of via a drive array controller card. Note that if the storage networking fabric 915 is NVMeOF, then it is designed to work with SSDs. If the data storage device 902 is an HDD, then the SOF interface 922 may include an NVMeOF adapter, e.g., to translate between NVMe and another HDD protocol such as SAS or SATA.

In some embodiments, devices in rack 902 can utilize computing and storage resources from second rack 904, and vice versa. As shown in this example, a bridge 924 is set up between the storage networking fabric 915 and a corresponding storage networking fabric 925 of the second rack 904. Rack 904 also has servers (e.g., server 926) and storage units (e.g., storage device or array 928) that can either utilize similar units from rack 902 as replacements or be utilized as replacements by unit in rack 902. The bridge 924 may include multiple components, e.g., interface devices within the racks 902, 904 and one or more link cables physically and electrically coupled between the racks 902, 904. The links may be wireless, in some embodiments.

Figure 10:
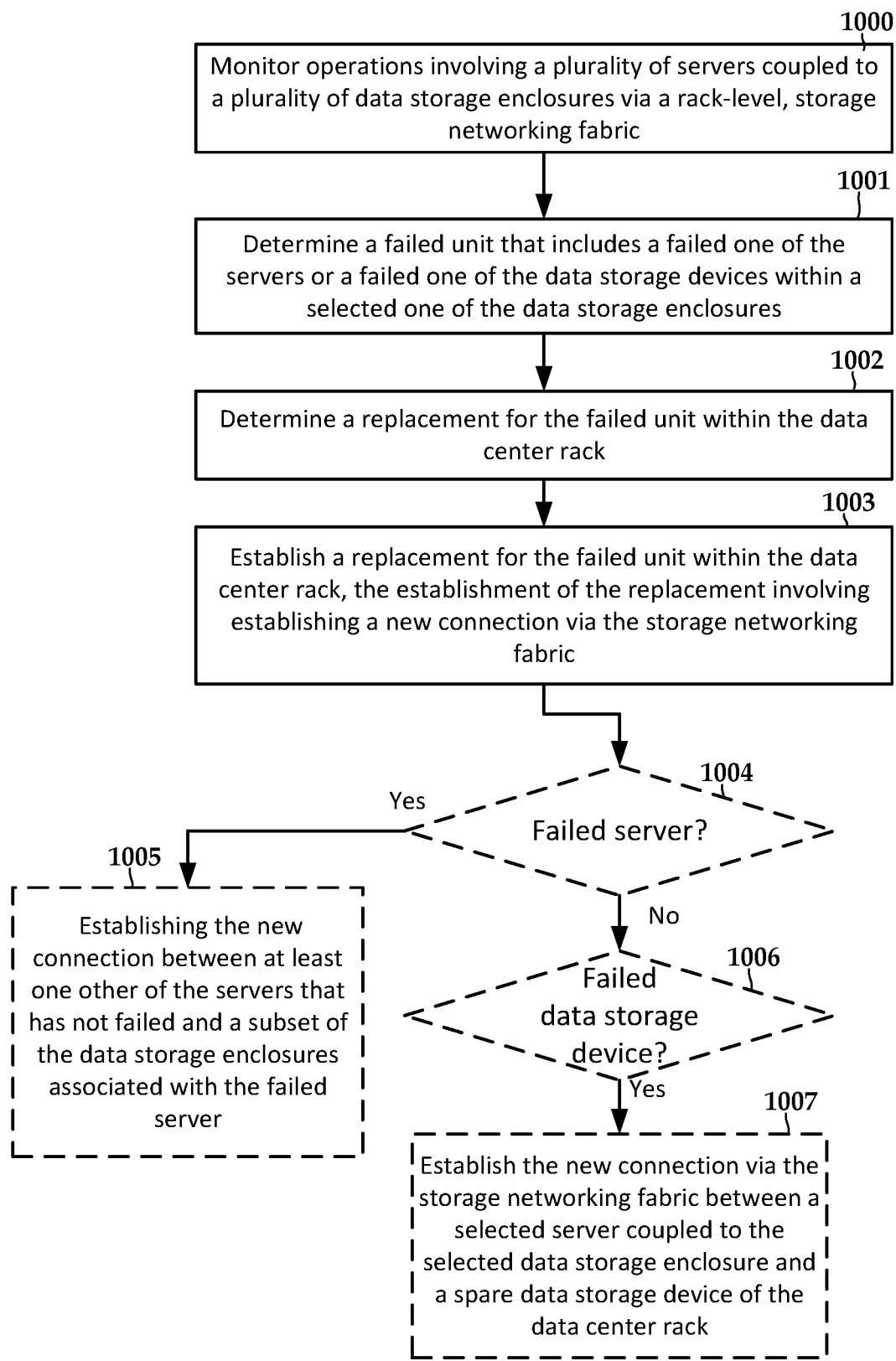
FIG. 10 is a flowchart of a method according to an example embodiment.

In FIG. 10, a flowchart shows a method according to an example embodiment. The method involves monitoring 1000 operations involving a plurality of servers coupled to a plurality of data storage enclosures via a rack-level, storage networking fabric. The servers are operable to provide data storage services utilizing the data storage enclosures via a network. The data storage enclosures each comprising one or more data storage devices. The servers and the data storage enclosures are mounted within a data center rack. The monitoring 1000 may be performed by the affected servers and/or data storage devices, and/or by an independent monitoring node. The monitoring 1000 may over via the storage networking fabric or via an out-of-band link, e.g., data center network.

A failed unit is determined 1001 via the monitoring. The failed unit includes a failed one of the servers or a failed one of the data storage devices within a selected one of the data storage enclosures. A replacement for the failed unit is determined 1002 within the data center rack, e.g., a compatible and operating device that can take over workload of the failed unit (e.g., in the case of a failed server) or replace the failed unit entirely (e.g., in the case of a failed data storage device). A replacement for the failed unit is established 1003 within the data center rack. The establishment of the replacement involves establishing a new connection via the storage networking fabric.

As indicated by block 1004, if the failed unit is a failed server the establishing of the replacement may optionally involve establishing 1005 the new connection via the storage networking fabric between at least one other of the servers that has not failed and a subset of the data storage enclosures associated with the failed server. So if the failed server controlled two data storage enclosure, for example, the other one or more servers would connect to and take over the two data storage enclosures.

As indicate by block 1006, if the failed unit is the failed data storage device, the establishing of the replacement may optionally involve establishing 1007 the new connection via the storage networking fabric between a selected server coupled to the selected data storage enclosure and a spare data storage device of the data center rack. In other words, the selected server previously controlled the failed data storage device and now connects to and controls the spare data storage device.

The various embodiments described above may be implemented using circuitry, firmware, and/or software modules that interact to provide particular results. One of skill in the arts can readily implement such described functionality, either at a modular level or as a whole, using knowledge generally known in the art. For example, the flowcharts and control diagrams illustrated herein may be used to create computer-readable instructions/code for execution by a processor. Such instructions may be stored on a non-transitory computer-readable medium and transferred to the processor for execution as is known in the art. The structures and procedures shown above are only a representative example of embodiments that can be used to provide the functions described hereinabove.

Unless otherwise indicated, all numbers expressing feature sizes, amounts, and physical properties used in the specification and claims are to be understood as being modified in all instances by the term "about." Accordingly, unless indicated to the contrary, the numerical parameters set forth in the foregoing specification and attached claims are approximations that can vary depending upon the desired properties sought to be obtained by those skilled in the art utilizing the teachings disclosed herein. The use of numerical ranges by endpoints includes all numbers within that range (e.g. 1 to 5 includes 1, 1.5, 2, 2.75, 3, 3.80, 4, and 5) and any range within that range.

The foregoing description of the example embodiments has been presented for the purposes of illustration and description. It is not intended to be exhaustive or to limit the embodiments to the precise form disclosed. Many modifications and variations are possible in light of the above teaching. Any or all features of the disclosed embodiments can be applied individually or in any combination are not meant to be limiting, but purely illustrative. It is intended that the scope of the invention be limited not with this detailed description, but rather determined by the claims appended hereto.

What is claimed is:

1. A system, comprising:
    a data center rack comprising:
        a plurality of servers operable to provide data storage services via a network;
        a plurality of data storage enclosures each comprising one or more data storage devices; and
        a rack-level, storage networking fabric coupled to the servers and data storage enclosures, the storage networking fabric providing many-to-many virtual storage connections between the servers and the data storage enclosures, the virtual connections replacing high-availability hard links between the servers and the data storage enclosures;
    wherein the system is configured to:
        detect a failed of one of the servers;
        determine a subset of the data storage enclosures previously connected to the failed server; and
        establish a new virtual connection via the storage networking fabric between at least one other of the servers that has not failed and the subset of the data storage enclosures, the at least one other server taking over the data storage services on behalf of the failed server.

2. The system of claim 1, wherein the at least one other server comprises two or more servers, and wherein the subset of data storage enclosures and associated workload of the failed server are distributed between the two or more servers.

3. The system of claim 1, wherein the data center rack comprises a first bridge coupled to the storage networking fabric, the system further comprising a second data center rack comprising:
    a plurality of second servers operable to provide second data storage services via the network;
    a second rack-level, storage networking fabric coupled to the second servers; and
    a second bridge coupled to the second rack-level, storage networking fabric and further coupled to the first bridge, wherein the first and second bridge are operable to establish the new virtual connection between at least one other of the second servers and the subset of the data storage enclosures.

4. The system of claim 1, wherein the plurality of data storage enclosures each comprise two or more arrays each comprising a plurality of the one or more data storage devices, the two or more arrays presented as two or more virtual devices, and wherein the at least one other server comprises two or more servers, the two or more virtual devices being distributed between the two or more servers.

5. The system of claim 1, wherein the storage networking fabric comprises an NVMeOF fabric.

6. The system of claim 5, wherein the one or more data storage devices comprise hard disk drives, the system comprising one or more NVMeOF adapters that couple the hard disk drives to the NVMeOF fabric.

7. The system of claim 1, wherein the storage networking fabric comprises an SAS switch.

8. A system, comprising:
a data center rack comprising:
a plurality of servers operable to provide data storage services via a network;
a plurality of data storage enclosures each comprising one or more data storage devices;
at least one spare data storage device; and
a rack-level, storage networking fabric coupled to the servers and data storage enclosures, the storage networking fabric providing many-to-many virtual storage connections between the servers and the data storage enclosures, the virtual connections replacing high-availability hard links between the servers and the data storage enclosures;
wherein the system is configured to:
detect a failed of one of the data storage devices within one of a selected one of the data storage enclosures, the selected data storage enclosure connected with a selected one of the servers; and
establish a new virtual connection via the storage networking fabric between the selected server and the at least one spare data storage device, wherein the at least one spare data storage device is not located in the selected data storage enclosure.

9. The system of claim 8, wherein the data center rack comprises a first bridge coupled to the storage networking fabric, the system further comprising a second data center rack comprising:
a second spare data storage device;
a second rack-level, storage networking fabric coupled to the second spare data storage device; and
a second bridge coupled to the second rack-level, storage networking fabric and further coupled to the first bridge, wherein the first and second bridge are operable to establish the new virtual connection between the selected server and the second spare data storage device.

10. The system of claim 8, wherein the storage networking fabric comprises an NVMeOF fabric.

11. The system of claim 10, wherein the one or more data storage devices comprise hard disk drives, the system comprising one or more NVMeOF adapters that couple the hard disk drives to the NVMeOF fabric.

12. The system of claim 8, wherein the storage networking fabric comprises an SAS switch.

13. A method comprising:
monitoring operations involving a plurality of servers coupled to a plurality of data storage enclosures via a rack-level, storage networking fabric, the storage networking fabric providing many-to-many virtual storage connections between the servers and the data storage enclosures, the virtual connections replacing high-availability hard links between the servers and the data storage enclosures, the servers operable to provide data storage services utilizing the data storage enclosures via a network, the data storage enclosures each comprising one or more data storage devices, the servers and the data storage enclosures mounted within a data center rack;
determining a failed unit comprising a failed one of the servers or a failed one of the data storage devices within a selected one of the data storage enclosures;
determining a replacement for the failed unit within the data center rack; and
establishing a replacement for the failed unit within the data center rack, the establishment of the replacement comprising establishing a new virtual connection via the storage networking fabric.

14. The method of claim 13, wherein the failed unit comprises the failed server, the establishing of the replacement comprises establishing multiple new virtual connections via the storage networking fabric between two or more the servers that has not failed and a subset of the data storage enclosures associated with the failed server, and wherein the subset of data storage enclosures and associated workload of the failed server are distributed between the two or more servers.

15. The method of claim 13, wherein the failed unit comprises the failed data storage device, the establishing of the replacement comprises establishing the new virtual connection via the storage networking fabric between a selected server coupled to the selected data storage enclosure and a spare data storage device of the data center rack.

16. The method of claim 13, wherein the storage networking fabric comprises an NVMeOF fabric.

17. The method of claim 16, wherein the one or more data storage devices comprise hard disk drives that are coupled to the NVMeOF fabric via one or more NVMeOF adapters.

18. The method of claim 13, wherein the storage networking fabric comprises an SAS switch.

19. The method of claim 13, wherein the data center rack comprises a first bridge coupled to the storage networking fabric, the system further comprising a second data center rack comprising:
a spare data storage device;
a second rack-level, storage networking fabric coupled to the spare data storage device; and
a second bridge coupled to the second rack-level, storage networking fabric and further coupled to the first bridge, wherein the new connection is between a server of the data storage rack and the spare data storage device.

20. The system of claim 1, wherein the system is configured to detect a failed of one of the data storage devices within one of a selected one of the data storage enclosures, wherein the data center rack comprises a first bridge coupled to the storage networking fabric, the system further comprising a second data center rack comprising:
a spare data storage device;
a second rack-level, storage networking fabric coupled to the spare data storage device; and
a second bridge coupled to the second rack-level, storage networking fabric and further coupled to the first bridge, wherein the first and second bridge are operable to establish a connection between one of the servers of the data center rack and the spare data storage device.

* * * * *